United States Patent Office 3,416,877
Patented Dec. 17, 1968

3,416,877
BASIC DYE DYEING OF POLYACRYLONITRILE ASSISTED BY TRIBUTYLPHOSPHATE AND A PHOSPHATE ESTER OF AN ETHYLENE OXIDE CONDENSATE
George M. Gantz, Easton, Pa., Henry R. Mautner, Leonia, N.J., and Edward J. Black, Easton, Pa., assignors to GAF Corporation, a corporation of Delaware
No Drawing. Filed May 8, 1963, Ser. No. 278,980
17 Claims. (Cl. 8—55)

ABSTRACT OF THE DISCLOSURE

A method of dyeing material containing 35 to 85% by weight of acrylonitrile in aqueous medium with a basic dye and a mixture of tributylphosphate and a water-soluble phosphate ester of a nonionic surface active condensation product of ethylene oxide with an organic compound containing at least 6 carbon atoms and a reactive hydrogen atom.

---

This invention relates to the coloration of polyacrylonitrile material and more particularly to the dyeing of structures containing at least about 35% by weight of polymerized acrylonitrile, but not more than 85% thereof.

The tremendous growth of the use of polyacrylonitrile material, especially as a fiber component, can readily be seen in the use of such material for textile manufacture and in the production of carpeting material. Textile uses include all of the possible outlets for woven fabrics, and particularly women's clothing, blankets and the like. For such uses it is readily apparent that a wide range of colors is required due to the public demand for same. The coloration of polyacrylonitrile material, and particularly the dyeing thereof in a wide range of colors and depths of shade has been a difficult problem to solve in view of the relative insolubility and unreactive and hydrophobic characteristics of this material. Numerous techniques have been developed whereby a wider range of dyestuffs is available including different types of dyes. Nevertheless, there is a constant demand for new shades, new colors, and new brilliance in this field, as well as in any of the dye fields. Among the dyestuffs which are outstanding for their fastness characteristics as well as brilliance and range of shade are the basic dyestuffs which heretofore have not been successful in the dyeing of many polyacrylonitrile materials, especially modacrylics.

It is therefore an object of the present invention to provide a process for dyeing polyacrylonitrile with basic dyestuffs, and especially modacrylics.

It is still another object of the present invention to provide a process for dyeing structures containing at least about 35% by weight of polymerized acrylonitrile in brilliant, deep shades of a wide range of colors employing basic dyestuffs and particularly those characterized as cationic dyestuffs.

Other objects will appear hereinafter as the description proceeds.

The objects of the present invention are achieved by the treatment by a conventional dyeing technique of the polyacrylonitrile material with a composition in combination with the dyestuff, which composition comprises tributyl phosphate and a water soluble phosphate ester of nonionic surface active compounds, which esters are characterized as mono- and/or diesters and mixtures thereof. By the employment of such a combination in the range of about 2 to 10 parts by weight of tributyl phosphate per part of phosphate ester of the nonionic surface active compound in the dyebath, it is possible to obtain colorations which are at least about twice as bright and heavy as those obtainable in the absence of this critical mixture.

The nonionic surface active precursors for the phosphate esters are well known and are those compounds which are derived from the interaction of at least one mole of an alkylene oxide, preferably 2–4 carbon atoms, with one mole of an organic compound containing at least six carbon atoms and a reactive hydrogen atom. Such reactive compounds include phenols, and aliphatic alcohols as disclosed, for example, in U.S. Patents 2,213,477 and 1,970,578, mercapto compounds such as dodecyl mercaptan, oleyl mercaptan, cetyl mercaptan, thiophenol and thionaphthol as disclosed, for example, in U.S. Patent 2,205,021, carboxylic acid amides, as disclosed in U.S. Patent 2,085,706, sulfonamides as disclosed in U.S. Patent 2,266,141, compounds designated as "Pluronics" as disclosed in U.S. Patent 2,674,619, among others, amines.

As is pointed out in these patents, and as is well known in the art, the nonionic surface active agents which are obtained by the interaction of reactive hydrogen containing organic compounds and alkylene oxides may employ as the alkylene oxide, ethylene oxide, propylene oxide, butylene oxide, or compounds which yield such oxides or react as such oxides, such as epichlorohydrin and the like.

While the nonionic surface active agents which may be used may contain as little as one oxyethylene group, it is preferred to employ those condensation products which contain an average of about at least 20% alkylene oxide of a hydrophilic nature and up to a maximum of about 85% alkylene oxide of a hydrophilic nature. Where ethylene oxide is employed and the resultant condensate contains oxyethylene groups, the above range would obtain. Where the higher alkylene oxides are employed, a suitable balance with ethylene oxide should be used such that the resultant condensation product contains sufficient oxyethylene groups to confer the hydrophilic characteristics equivalent to a content of 20 to 85% ethylene oxide. In other words, while the minimum of 20% ethylene oxide is stated above as necessary to confer a sufficient degree of hydrophilic characteristics to obtain the necessary phosphate esters which are useful in the present invention, it is possible by employing a mixture of alkylene oxides to lessen the requirement for the minimum ethylene oxide content of 20%. To illustrate this point, one may employ a mixture of ethylene oxide and propylene oxide with a selected phenol such as nonyl phenol whereby the resultant condensation product contains 15% oxyethylene groups and 15% oxypropylene groups, the former as the terminating groupings. This combination would confer sufficient hydrophilic characteristics to render the corresponding phosphate esters efficacious in the dyeing processes of the present invention. In no case should less than about 10% ethylene oxide be used.

The phosphate esters used in the present invention may be prepared by numerous techniques. The preferred method involves the reaction of one mole of $P_2O_5$ with 2 to 4.5 moles of the nonionic surfactant as described and claimed in U.S. Patent 3,004,056 by Nunn and Hesse and U.S. Patent 3,004,057 by Nunn. As described in the said Nunn and Hesse patent, the reaction between the $P_2O_5$ and the nonionic polyoxyalkylene ether is conducted under substantially anhydrous conditions and at a temperature below about 110° C. In its preferred form, the reaction is carried out by adding the $P_2O_5$ gradually, with vigorous agitation to the nonionic surface active agent in liquid form. The reaction is exothermic and cooling is in some cases necessary to keep the temperature below 110° C., since discolored and darkened products tend to be produced above this temperature. The reaction proceeds continuously during the addition of the $P_2O_5$ and is preferably followed by maintenance of the reaction mixture at ambient temperatures up to 110° C. for an additional period of time after completion of such addition to allow for complete solution of the P$_2$O$_5$ and reaction with the nonionic surface active agent.

The following examples illustrate the preparation of such phosphate esters.

EXAMPLE A 2.7 moles of a nonionic surface active compound derived from dinonyl phenol condensed with 4 moles of ethylene oxide is reacted with 1 mole of P$_2$O$_5$ in the manner described in the examples of U.S. Patent 3,004,056. The product consists of about equal amounts of mono- and diesters with about 10–15% unreacted nonionic.

EXAMPLE B

The procedure of Example A is repeated except that the nonionic compound is derived from the interaction of nonyl phenol with 1.5 moles of ethylene oxide (ethylene oxide content of condensate 29.2%).

EXAMPLE C

The procedure of Example B is repeated except that 6.0 moles of ethylene oxide are condensed to yield a nonionic containing 54.5% ethylene oxide.

EXAMPLE D

Example B is again repeated except that about 10 moles of ethylene oxide are reacted to yield a condensation product containing about 64% ethylene oxide.

EXAMPLE E

Example A is again repeated except that the reaction is carried out between tridecyl alcohol (obtained by the oxo process from using triisobutylene) and 9.75 moles of ethylene oxide to yield a product containing 68% ethylene oxide.

EXAMPLE F

The procedure of Example A is repeated except that the nonionic is a dodecyl phenol plus 6 moles of ethylene oxide condensate.

EXAMPLE G

The procedure of Example A is again repeated employing as the nonionic surface active agent a dinonyl phenol plus 24 moles ethylene oxide (75% ethylene oxide content).

EXAMPLE H

The procedure of Example A is once again repeated employing as the surfactant a dinonyl phenol plus 7 moles ethylene oxide (47% ethylene oxide content).

EXAMPLE I

The procedure of Example A is still once again repeated employing as the nonionic surface active agent dinonyl phenol reacted with 15 moles of ethylene oxide to yield a nonionic product containing about 20% ethylene oxide.

EXAMPLE J

The above procedures are again repeated using as the nonionic precursor the condensation product of dodecyl phenol with 18 moles of ethylene oxide.

EXAMPLE K

In the following examples the procedure of Example A is repeated using the indicated nonionic compounds:

(1) n-Hexyl alcohol+1 EO.[1]
(2) Isooctyl alcohol+2.5 EO.
(3) Nonyl alcohol+3 EO.
(4) Dodecyl mercaptan+2 EO.
(5) Dodecyl mercaptan+9 EO.
(6) Catyl mercaptan+4 EO.
(7) Dinonyl phenol+9.6 EO.
(8) Dinonyl thiophenol+9 EO.

[1] Ethylene oxide.

(9) Soya bean oil amine+10 EO.
(10) Rosin amine+15 EO.
(11) Isooctyl amine+8 EO.
(12) Dodecyl benzene sulfonamide+10 EO.
(13) Decyl sulfonamide+6 EO.
(14) Oleic acid+15 EO.
(15) Stearic acid+12 EO.
(16) Stearamide+8.5 EO.
(17) Tetradecylbenzamide+12 EO.
(18) Polypropylene glycol (average M.W.=750)+2 EO.
(19) Polypropylene glycol (average M.W.=400)+6 EO.
(20) Dinonyl phenol+15 EO.

The chemical constitution of the products produced in the above described examples will usually be about 20 to 50% of the secondary phosphate ester of the nonionic agent, 30 to 80% of the primary phosphate ester, and 0 to 40% of unreacted nonionic agent.

By carrying out the above reaction in the presence of a small amount of a phosphorus-containing compound selected from the group consisting of hypophosphorous acid, salts of hypophosphorous acid, phosphorous acid, and salts and esters of phosphorous acid, preferably sodium hypophosphite or hypophosphorous acid, as described in said Nunn Patent 3,004,057, lighter colored or substantially colorless reaction products are obtained.

While the presence of unreacted nonionic is not detrimental to the attainment of the objects of the present invention, the amount of nonionic can be reduced, if desired, to a minimum of less than about 10% by incorporating in the reaction mixture, a small amount of mineral acid such as phosphoric acid, hydrochloric acid or sulfuric acid. Since phosphorous pentoxide yields phosphoric acid in the presence of water, the latter can advantageously and preferably be used to form the acid "in situ." With the use of the mineral acid the amount of phosphorous pentoxide can also be increased to as much as 3 moles per mole of nonionic reactant, thereby favoring the formation of the monoester in major amounts, i.e., substantially no diester.

Monoesters and diesters can also be prepared from the corresponding triesters by reacting the triester with phosphoric acid. By varying the ratio of nonionic to acid, one can prepare either mono- or diester to the substantial exclusion of the other. A high ratio of triester to acid (2:1) produces diester whereas a low ratio (0.5:1) produces monoester.

EXAMPLES L(1) AND L(2)

Equimolar amounts of the nonionic surface active compounds of Examples E and K(7) and phosphorous pentoxide are heated at 90° C., while adding in the presence of about 0.4% water the P$_2$O$_5$ over a period of one hour. Then the reaction mixture is heated for 4 hours at 125° C. The final products are monoesters.

EXAMPLE M

Example L procedure is repeated employing one mole of a dodecyl phenol plus 2 moles ethylene oxide condensate and two moles of P$_2$O$_5$. The final product is a monoester.

EXAMPLE N

A phosphate triester of the nonionic compound of Example K(7) is prepared by reacting 3 moles of said nonionic with 1 mole of phosphorous oxychloride in the presence of 1 mole of pyridine and 100 ml. of benzene. The POCl$_3$ is added dropwise to the other components at a temperature of about 0° C. and the temperature is held below 10° C. After all of the POCl$_3$ has been added, the mixture is refluxed for 3 hours and then the solvent is removed under vacuum distillation. The triester results.

The triester is converted to a monoester by adding 1 mole of phosphoric acid to 0.5 mole of the triester at about room temperature. The monoester results.

EXAMPLE O

Example N is repeated except that 2 moles of triester are used in lieu of 0.5 mole. The diester results.

The mono- and di-phosphated products may be represented by the following formulae:

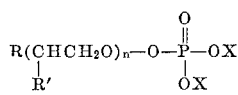

and

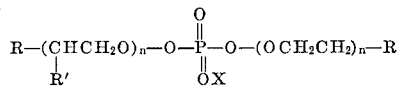

wherein R' represents H or methyl; X may be hydrogen, alkali metal, ammonium or substituted ammonium, or any cation which forms water soluble salt, and $n$ equals the number of moles of alkylene oxide necessary to yield a final product containing up to 50% by weight of the said alkylene oxide as discussed above; R is the hydrophobe nucleus.

The structures which are contemplated as physical forms of the polyacrylonitrile material include fibers, filaments, yarns, warps, fabrics, bristles, films, tubings, molded articles and the like. The polymerized acrylonitrile forming the basis of such structures is present in proportions of at least about 35% by weight and is in the form of recurring units as a copolymer, graft copolymer, interpolymer (terpolymer and the like), graft interpolymer, or mixtures thereof. In addition to the acrylonitrile copolymer, there may also be present other polymeric materials as homopolymers, copolymers and the like in admixture with the acrylonitrile copolymer. As the other component, i.e., in addition to the acrylonitrile, of the copolymer and the like, which may be present in amounts up to about 65% by weight, there may be employed one or more of the following illustrative compounds:

Vinyl chloride
Vinyl acetate
Vinyl propionate
Vinyl fluoride
Vinylidene chloride
Vinylidene cyanide
Methyl vinyl ketone
Ethyl vinyl ketone
Isobutyl vinyl ketone
2-vinyl pyridine
4-vinyl pyridine
5-ethyl-2-vinyl pyridine
2-vinyl quinoline
4-vinyl quinoline
Vinyl methyl ether
Vinyl ethyl ether.
Vinyl isobutyl ether and other vinyl ethyl ethers such as
Vinyl hexadecyl ether
Vinyl octadecyl ether
Vinyl imidazole
N-vinyl pyrrolidone
N-vinyl oxazoladone
Acrylic acid
Alkyl acrylates, such as
Methyl acrylate
Ethyl acrylate and the like
Acrylamide
Methacrylic acid
Alkyl methacrylates
Chloracrylic acid
Alkyl-α-chloroacrylates
Methacrylamide
α-Chloroacrylamide
Ethers of fumaric and maleic oxide
Styrene
α-Methyl styrene.

Divinyl benzene and polymerizable acyclic hydrocarbons such as

Ethylene
Propylene
Isobutylene
Butadiene and the like.

The usual modifying agents may also be present in the structures and these include plasticizers, films, and the like. In addition, the polyacrylonitrile containing structures which are contemplated in the processes of the present invention may also be admixed with other conventional fiber or fabric, with other fibers such as cotton, wool, rayon, nylon, polyesters and the like.

The basic dyes employed in the present process are a class of dyestuffs well known in the art, being characterized as salts of colored organic cations with simple anions which are usually inorganic in nature. Generally, such dyes are devoid of sulfonic and carboxylic acid groups and the like and are instead characterized by the presence of an amino group or a quaternary ammonium structure in which the anion is generally derived from a strong acid, e.g., chloride, bromide or iodide, metho or ethosulfate, sulfate or bisulfate, benzene, halogen (e.g., toluene) sulfonic acid. The anions of stronger acids generally yield more water soluble dyestuffs. The colored cations may, however, also be present as salts with weaker acids, e.g., the anions of acetic acid, formic acid, oxalic acid, lactic acid, tartaric acid. The double salts of the basic dyes may also be employed, particularly the zinc chloride double salts and the chlorozincate or chlorocadmiate ion. The anion may also be hydroxyl.

As stated above, many types of basic dyestuffs are known and readily available to the trade, including dyestuffs of the triarylmethane series, the oxazine series, the polymethine series, and the like.

In general, the basic dyestuffs are applied to the structures to be dyed in amounts yielding about 0.1 to about 10% by weight of the dyestuffs based upon the weight of the material to be dyed. The phosphate mixture described above used in combinations with the dyebath is employed in amounts ranging from about 1% to about 10% by weight based on the weight of the material to be treated. The preferred range is from about 2% to about 7.5% by weight.

As described above, the mixed phosphate composition is applied to the polyacrylonitrile material in conjunction with the basic dyestuff during the dyeing procedure. The latter is carried out in the usual manner whereby the material to be dyed is placed in the dyebath liquor at temperatures ranging from room temperature up to the boil and then maintained at elevated temperatures of from 100° F. to the boil until the dyebath is substantially exhausted. One may employ higher temperatures for dyeing through the use of superatmospheric pressures whereby temperatures up to about 300° F. may be achieved. Although such higher temperatures are operative, it is usually not necessary to go beyond the boil to effect outstanding dyeings.

The pH of the dyebath is not critical but it is preferred to maintain substantially neutral or slightly acid conditions to avoid any possibility or tendency for the basic dyestuffs used in the dyeing procedure to precipitate. The phosphate ester in free acid form have a mild acid pH in the concentrations herein contemplated and are therefore excellently adapted for use with the basic dyestuffs. As pointed out above, however, these esters may also be used in the form of their water-soluble salts since the pH in the dyebaths, in the concentrations of use, of such solutions is only slightly alkaline. Preferably, the phosphate esters are used in the free acid form, however. Obviously, the dyeing process may be carried out either in a batch or in a continuous manner as well as in any modifications thereof to effect an overall as well as a local ornamental dyeing. Further, in addition to the phosphate mixture and dyestuff combination employed to obtain the outstanding dyeings of the present process, one may also use in the dyebath any of the conventional well-known additives such as softening agents and the like.

The following examples will serve to illustrate the present invention. Parts are by weight unless otherwise indicated.

EXAMPLE 1

A 10 g. sample of yarn of a vinyl chloride (60%)-acrylonitrile (40%) copolymer is introduced into 300 ml. of an aqueous bath containing 0.100 g. Yellow Dye C.I. 48,055 at 180° F. and dyed in the bath for 1½ hours. The yarn is dyed a dull, reddish yellow.

EXAMPLE 2

Example 1 is repeated except that the dyebath also contains 0.5 g. of a 4:1 mixture of tri-n-butyl phosphate and the phosphate ester of Example K(7). This dyeing has double the strength of and is much brighter than that of Example 1.

EXAMPLE 3

Examples 1 and 2 are repeated employing the following dyestuffs identified by Color Index numbers (a) C.I. 48,035 (orange)
(b) C.I. 48,040 (orange)
(c) C.I. 48,015 (pink)
(d) Basic Red 14 (pink)
(e) C.I. 48,013 (red)
(f) C.I. 51,005 (blue)
(g) C.I. 42,500 (red).

The improvement employing the phosphate mixture in each instance is comparable to that of Example 2 vs. Example 1.

EXAMPLE 4

Examples 1 and 2 are again repeated employing yarns of the following composition:

(a) Acrylonitrile (50%)-vinyl chloride (50%) copolymer
(b) Acrylonitrile (85%)-vinyl chloride (15%) copolymer
(c) Acrylonitrile (85%)-stryene (15%) copolymer
(d) Acrylonitrile (80%)-vinyl acetate (20%) copolymer
(e) Acrylonitrile (85%)-methyl acrylate (15%) copolymer
(f) Acrylonitrile (80%)-acrylamine (20%) copolymer
(g) Acrylonitrile (80%)-allyl alcohol (20%) copolymer
(h) Acrylonitrile (85%)-butyl methacrylate (15%) copolymer
(i) Acrylonitrile (80%)-vinyl acetate (15%)-vinyl pyridine (5%) terpolymer
(j) Acrylonitrile (84%)-vinyl acetate (11%)-methyl vinyl pyridine (5%) terpolymer
(k) Acrylonitrile (62%)-vinyl chloride (23%)-vinylidene chloride (15%) terpolymer
(l) Acrylonitrile (60%)-vinyl imidazole (40%) copolymer
(m) Acrylonitrile (82%) - vinyl pyrrolidone (18%)- (graft copolymer from preformed polyvinylpyrrolidone)
(n) Acrylonitrile (85%) - 2 - methyl-5-vinyl pyridine (15%) (graft copolymer from preformed poly-2-methyl-5-vinyl pyridine)
(o) Polyacrylonitrile (72%) - polyvinylpyrrolidone (28%) copolymer
(p) Acrylonitrile-vinyl acetate copolymer (3:1)-[80%] polyvinylpyrrolidone [20%] mixture
(q) Polyacrylonitrile (86%) - polyvinylmorpholinone (14%) copolymer.

Much improved dyeings are obtained following the procedure of Example 2 over Example 1.

EXAMPLE 5

Example 2 is repeated employing the indicated amounts of phosphate mixture:

(a) 0.1 g. of 4:1 mixture [1]
(b) 0.2 g. of 4:1 mixture
(c) 1.0 g. of 4:1 mixture
(d) 0.2 g. of 2:1 mixture
(e) 0.2 g. of 5:1 mixture
(f) 0.2 g. of 10:1 mixture
(g) 0.5 g. of 6:1 mixture
(h) 0.5 g. of 8:1 mixture
(i) 0.7 g. of 4:1 mixture.

[1] Ratio of tributyl phosphate to phosphated nonionic composition.

Dyeings comparable to Example 2 are obtained with 5(b), 5(c), 5(e), 5(g), 5(h) and 5(i) being outstanding.

EXAMPLE 6

Example 2 is repeated using the indicated phosphated nonionic derivatives:

| Example 6 | Amt. and Ratio of Ex. | Phosphated Nonionic of Ex. |
|---|---|---|
| (a) | 2 | A |
| (b) | 2 | C |
| (c) | 2 | E |
| (d) | 2 | F |
| (e) | 2 | J |
| (f) | 2 | K(1) |
| (g) | 2 | K(12) |
| (h) | 2 | K(14) |
| (i) | 2 | K(19) |
| (j) | 5b | A |
| (k) | 5b | C |
| (l) | 5b | D |
| (m) | 5b | E |
| (n) | 5b | F |
| (o) | 5b | G |
| (p) | 5b | K(5) |
| (q) | 5b | K(9) |
| (r) | 5b | K(12) |
| (s) | 5b | K(18) |
| (t) | 5h | A |
| (u) | 5h | D |
| (v) | 5h | F |
| (w) | 5h | K(1) |
| (x) | 5h | K(5) |
| (y) | 5h | K(12) |
| (z) | 5h | K(18) |
| (aa) | 5i | A |
| (bb) | 5i | C |
| (cc) | 5i | E |
| (dd) | 5i | K(2) |
| (ee) | 5i | K(18) |
| (ff) | 2 | L(2) |
| (gg) | 2 | M |
| (hh) | 2 | O |
| (ii) | 5h | L(2) |
| (jj) | 5h | M |
| (kk) | 5i | M |

EXAMPLE 7

Example 1 is repeated except that the bath contains additionally 0.1 g. of a mixture of

| | Percent |
|---|---|
| Nonionic from nonylphenol+30 moles ethylene oxide | 70 |
| Monobutylether of ethylene glycol | 10 |
| Water | 20 |

A slight improvement is obtained versus Example 1.

EXAMPLES 8(a)–8(e)

Examples 2, 3, 4, 5 and 6 are repeated (Examples 8(a)–8(e), respectively), using the additional 0.1 g. additive of Example 7. The dyeings are at least twice as heavy and brighter with the phosphate mixture versus the dyeings without this mixture.

In all of the above examples the phosphated nonionics are employed in the free acid form.

EXAMPLE P

Each of the Examples A through K (thirty examples) is repeated empolying mole ratios of nonionic to $P_2O_5$ as follows:

(A) 2.0:1 [Examples P(1)–P(30)]
(B) 2.5:1 [Examples P(31)–P(60)]
(C) 3.5:1 [Examples P(61)–P(90)]
(D) 4:1 [Examples P(91)–P(120)].

EXAMPLE 9

Examples 2 and 8(a) are repeated employing, however, the phosphated nonionic compositions of Examples P(17), P(47), P(77), P(93), P(107) and P(114).

EXAMPLE 10

Examples 2, 3, 4, 5, 6(a), 6(b), 6(c), 6(e), 6(m) are repeated employing the phosphate esters in the form of the (a) Sodium salts,
(b) Ammonium salts,
(c) Isopropylamine salts,
(d) Ethylene diamine salts, and
(e) Cyclohexylamine salts.

Excellent dyeings are obtained.

EXAMPLE Q

A condensation product of nonyl phenol with 1 mole of propylene oxide is further condensed with 2 moles of ethylene oxide and then phosphated as in Example A.

EXAMPLE R

One mole of dinonyl phenol is condensed with 4 moles of propylene oxide and then 8 moles of ethylene oxide. This product is phosphated as in Examples A, L and O.

EXAMPLE 11

Examples 2–5 are repeated employing the phosphate esters of Examples Q and R in the form of their free acids and also in the form of salts as in Example 10.

Other variations in and modifications of the described processes which will be obvious to those skilled in the art can be made in this invention without departing from the scope or spirit thereof.

We claim:

1. A process for coloring a polyacrylonitrile-containing material containing from about 35 weight percent to less than about 85 weight percent of acrylonitrile in polymerized form and the balance a polymerizable ethylenically unsaturated compound in polymerized form comprising treating said material in aqueous media with
   (1) a basic dye and
   (2) a mixture of
      (a) 2 to 10 parts by weight of tributyl phosphate per part of
      (b) a water-soluble phosphate ester of a nonionic surface active compound selected from the class consisting of mono- and diesters and mixtures thereof, said nonionic surface active compound having the molecular configuration of a condensation product of
         (I) an organic compound of at least 6 carbon atoms and containing a reactive hydrogen atom and
         (II) at least one mole of ethylene oxide, said nonionic surface active compound containing at least 10% by weight of said ethylene oxide in condensed form.

2. A process for coloring a polyacrylonitrile-containing material containing from about 35 weight percent to less than about 85 weight percent of acrylonitrile in polymerized form and the balance a polymerizable ethylenically unsaturated compound in polymerized form comprising treating said material in aqueous media with
   (1) a basic dye and
   (2) a mixture of
      (a) 2 to 10 parts by weight of tributyl phosphate per part of
      (b) a water soluble phosphate ester of a nonionic surface active compound selected from the class consisting of mono- and diesters and mixtures thereof, said nonionic surface active compound having the molecular configuration of a condensation product of
         (I) a phenol and
         (II) at least one mole of ethylene oxide, said nonionic surface active compound containing at least 10% by weight of said ethylene oxide in condensed form.

3. A process as defined in claim 2 wherein the phenol is nonyl phenol.

4. A process as defined in claim 2 wherein the phenol is dinonyl phenol.

5. A process as defined in claim 2 wherein the phenol is dodecyl phenol.

6. A process as defined in claim 2 wherein the phenol is diisobutyl phenol.

7. A process for coloring a polyacrylonitrile-containing material containing from about 35 weight percent to less than about 85 weight percent of acrylonitrile in polymerized form and the balance a polymerizable ethylenically unsaturated compound in polymerized form comprising treating said material in aqueous media with
   (1) a basic dye and
   (2) a mixture of
      (a) 2 to 10 parts by weight of tributyl phosphate per part of
      (b) a water-soluble phosphate ester of a nonionic surface active compound selected from the class consisting of mono- and diesters and mixtures thereof, said nonionic surface active compound having the molecular configuration of a condensation product of
         (I) an alcohol of at least 6 carbon atoms and
         (II) at least one mole of ethylene oxide, said nonionic surface active compound containing at least 10% by weight of said ethylene oxide in condensed form.

8. A process as defined in claim 7 wherein the alcohol is hexyl alcohol.

9. A process as defined in claim 7 wherein the alcohol is tridecyl alcohol.

10. A process for coloring a polyacrylonitrile-containing material containing from about 35 weight percent to less than about 85 weight percent of acrylonitrile in polymerized form and the balance a polymerizable ethylenically unsaturated compound in polymerized form comprising treating said material in aqueous media with
    (1) a basic dye and
    (2) a mixture of
       (a) 2 to 10 parts by weight of tributyl phosphate per part of
       (b) a water-soluble phosphate ester of a nonionic surface active compound selected from the class consisting of mono- and diesters and mixtures thereof, said nonionic surface active compound having the molecular configuration of a condensation product of
          (I) a phenol and
          (II) at least 6 moles of ethylene oxide.

11. A process as defined in claim 10 wherein the nonionic surface active compound is a condensation product of dinonyl phenol with about 9.6 moles of ethylene oxide.

12. A process as defined in claim 11 wherein 4 parts of tributyl phosphate are present per part of phosphate ester (b).

13. A process as defined in claim 1 wherein the polyacrylonitrile material is a copolymer of acrylonitrile and a vinyl halide.

14. A process as defined in claim 1 wherein the polyacrylonitrile material is a copolymer of acrylonitrile and a vinyl ester of a lower fatty acid.

15. A process as defined in claim 1 wherein the polyacrylonitrile material is an interpolymer containing less than about 50% acrylonitrile in polymerizeed form.

16. A process as defined in claim 1 wherein the polyacrylonitrile material is an interpolymer containing more than about 50% acrylonitrile in polymerized form.

17. A process as defined in claim 12 wherein the polyacrylonitrile material is a copolymer of about 60% vinylchloride and 40% acrylonitrile.

References Cited

UNITED STATES PATENTS

| | | | |
|---|---|---|---|
| 2,636,802 | 4/1953 | Wesp | 8—55 |
| 2,543,316 | 2/1951 | Field | 8—55 |
| 1,733,057 | 10/1929 | Felix | 8—89 |
| 1,777,038 | 9/1930 | Gibson | 8—89 |
| 2,949,432 | 8/1960 | Tarkington et al. | 8—55 |
| 3,211,514 | 10/1965 | Casty | 8—93 |

OTHER REFERENCES

Schmidlin: The Preparation and Dyeing of Synthetic Fibres, pub. April 1963, pp. 152–153, 155, 156, 157, 159, 331–332.

NORMAN G. TORCHIN, *Primary Examiner.*

D. LEVY, *Assistant Examiner.*

U.S. Cl. X.R.

8—90